United States Patent [19]

Strunk

[11] 4,175,759

[45] Nov. 27, 1979

[54] WINTER SPORT DEVICE

[76] Inventor: Harald Strunk, Dilsbach-Str. 21, 6107 Reinheim 3, Fed. Rep. of Germany

[21] Appl. No.: 879,486

[22] Filed: Feb. 21, 1978

[30] Foreign Application Priority Data

Feb. 21, 1977 [DE] Fed. Rep. of Germany ....... 2707364

[51] Int. Cl.² ............................................. B26B 13/00
[52] U.S. Cl. ...................................... 280/16; 280/21 A
[58] Field of Search ..................... 280/21 R, 21 A, 15, 280/16

[56] References Cited

U.S. PATENT DOCUMENTS 3,583,507  6/1971  Trautwein ......................... 280/21 A
4,036,506  7/1977  Scheib ............................... 280/21 A

FOREIGN PATENT DOCUMENTS 803852  10/1936  France .................................... 280/21 A Primary Examiner—Joseph F. Peters, Jr.
Assistant Examiner—Norman L. Stack, Jr.
Attorney, Agent, or Firm—Michael J. Striker

[57] ABSTRACT

A winter sport device includes a pair of elongated parallel skids, a user support upwardly spaced from the skids, and an arrangement mounting the support on the skids for tilting movement of the support about a first axis parallel to the elongation of the skids and for simultaneously converting the tilting movement into a corresponding tilting movement of the skids about a second axis paralleling the first axis.

9 Claims, 9 Drawing Figures

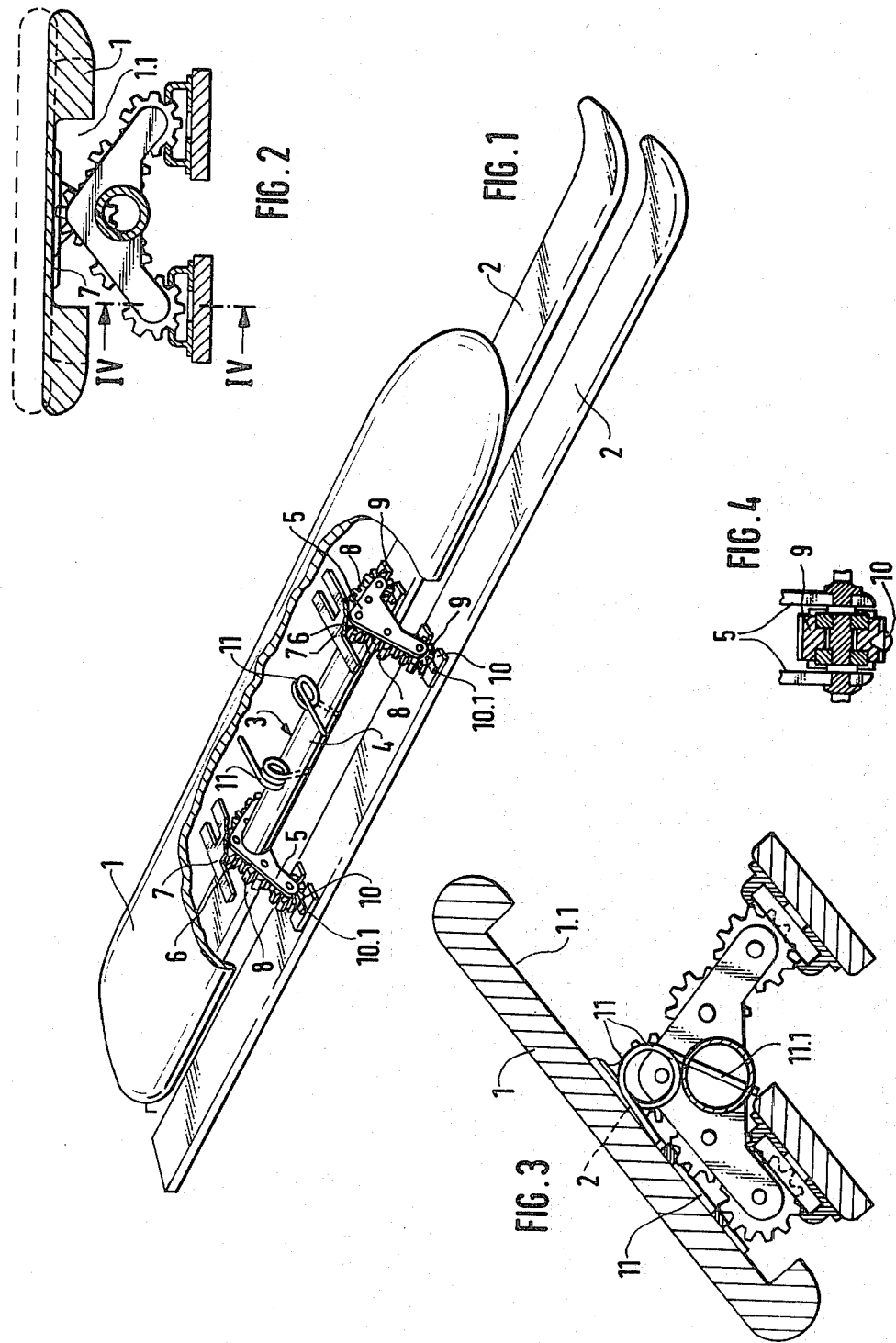

WINTER SPORT DEVICE

BACKGROUND OF THE INVENTION

The present invention relates to a winter sport device having a user support and a pair of parallel skids.

It is known in the art to use bobsleighs, where a user sits on a support. Such bobsleighs are usually guided by a one-sided braking device. So-called "steerable" bobsleighs are additionally provided with a pair of tiltable skids, which are connected with a steering device. Usually a ski-rider steers by the application of numerous forces which interact in complicated manner, including shifting of the weight of the rider.

It has been recognized that such constructions are not satisfactory with respect to the requirements which are made as to ease and reliability of steering of winter sports devices.

SUMMARY OF THE INVENTION

It is a general object of the present invention to avoid the disadvantages of the prior art devices. More particularly, it is an object of the present invention to provide a winter sport device on which a user may stand without requiring that his body be firmly secured to the device, and can steer the device essentially by weight displacement.

In pursuance of these objects and others which will become apparent hereafter, one feature of the present invention resides in providing a winter sport device, comprising a pair of elongated parallel skids and a user support above said skids, with means mounting the support on the skids for tilting movement relative to the same about a first axis parallel to the elongation of said skids, and for converting the tilting movement into a corresponding tilting movement of the skids about respective second axis paralleling the first axis.

The user can use such winter sport device in the manner of using a surfboard. He can stand upon the support and steer the device by displacing his weight either to the left or to the right, so as to tilt the support about its longitudinal axis to the right or to the left in downward direction. The steering action is carried out by transmitting these tilting movements to the skids, by displacing the lead back and forth onto the cantilevers sections of the plate and/or by twisting the body of the user. The displacement of the edges of the skids (sideslip or inclining a skid edge during slope running) guarantees maintenance of the user's equilibrium.

According to a further concept of the present invention the device is provided with resilient means, for example springs, designed to urge a central portion of the user support to its horizontal position. This facilitates the rider bringing the device from a tilting position into the initial horizontal position which is required for straight-line running of the device. Besides, steering will also be facilitated because a direct relationship exists between the sidewise turning movement of the support due to the weight displacement and the change in direction of the device, and this will be evident to the user. At the same time the stability of the steering action will be improved.

According to a further concept of the present invention the skids have an essentially flat underside in the manner of conventional skis. Due to this fact, not only very easy and quick sliding is achieved, but also substantially effective steering, because edge displacement of the skis becomes possible. A further advantageous feature of the present invention is that in making such winter sport device, skis can be used.

A particularly advantageously feature of the present invention is seen in providing the device with means for converting tilting movements of the support into corresponding tilting movements of the skids, such means being formed as a gear device comprising a driving gear rigidly connected with the user support, driven gears, each of which is rigidly connected with each skid and operatively connected to the driving gear through an intermediate gear element, such as intermediate gears. This gear combination makes possible a simple production and small dimensions and assures the transmission of relatively high moments. Besides that, due to the high pressure per unit of area on the meshing gears, the gearing is not sensitive to the penetration thereinto of ice or snow.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a perspective view of a winter sport device according to this invention;

FIG. 2 is a cross-sectional view of the winter sport device of FIG. 1;

FIG. 3 is a cross-sectional view of the winter sport device of FIG. 1, where a user support and a pair of skids are shown in their respective position at the end of their tilting movement;

FIG. 4 is a sectional view taken along the line IV—IV on FIG. 2;

DESCRIPTION OF THE PREFERRED EMBODIMENTS

Figure 5:
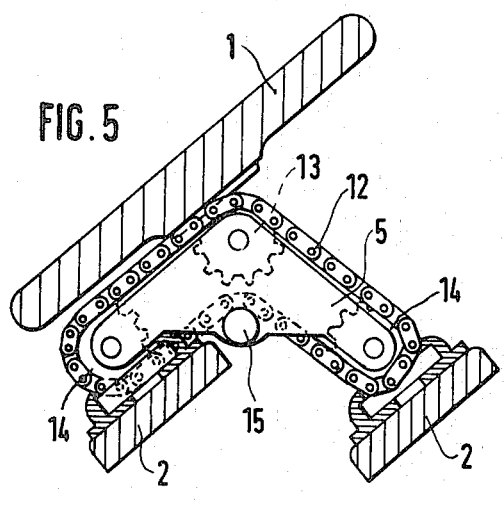
FIG. 5 is a cross-sectional view similar to FIG. 3 but showing an embodiment having a chain drive.

Referring now to the drawings and first to FIG. 1 thereof, it may be seen that the reference numeral 1 is used to designate a plate (or other supporting structure) to support a user and reference numeral 2 to designate two parallel skids downwardly spaced from the plate 1. The plate 1 and the skids 2 are tiltably mounted on supporting means comprising two bridge-shaped supports 5 connected with each other by a tube 3, which, for example, can be welded to the supports 5. The bridge-shaped supports 5 are formed as three-cornered housings, at the upper point of each of which there is a gear wheel 6 with radial serrations, designated as a driving gear. Each of the driving gears 6 is connected with two carriers 7, respectively, for example by being welded thereto. The carriers 7 are rigidly secured on the underside of the plate 1. At both sides of each drive gear 6 and somewhat downwardly from the latter in the housing 5 there are rotatably mounted intermediate gears 8 meshing with the driving gears 6 and with driven gears 9 which are mounted at the lower end of housing 5. The intermediate gears and driven gears are provided with radial serrations. Each of the driven gears 9 is rigidly connected, for example welded, to a support 10 which is fixedly mounted on the upper side of a respective skid 2.

In order to render bowing and flexing of the skids 2 possible, each support 10 is provided with a horizontal axle spaced transversely to the elongation of the skids 2. These axles are more clearly shown in FIG. 9. In order to balance out any displacement between the supports 10, which can occur due to bowing and flexing of the skids 2, the axle 10.1 of one of the supports 10 of each skid 2 is provided with a backlash (play) in the longitudinal direction of the skids 2.

Two leg springs 11, longitudinally spaced from each other between two supports 5 (FIGS. 1 and 3) are each placed with one of its legs 11.1 in the tube 4, while the other leg 11.2 abuts the plate 1 at the underside of the latter. Both leg springs tend to urge the plate 1 into its horizontal position.

The plate 1 may, for example, be made of synthetic plastic resin material having a cavity filled foam-plastic material. The plate 1 can be formed with a recess 1.1 provided in the central portion of the underside of the plate 1. The recess 1.1 is designated to receive the supports 5 and tube 4 during the tilting movement of the latter, as shown in FIG. 3. In FIG. 2 the dotted lines show that the plate 1 can, however, also be formed without any recess and be placed completely above the carrier 7.

Figure 6:
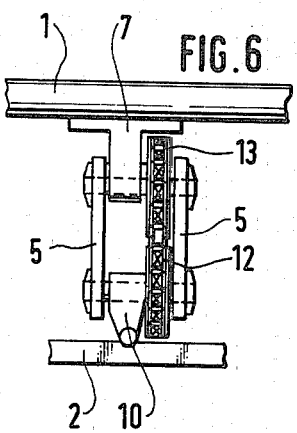
FIG. 6 is a side view of the chain drive in FIG. 5.

The embodiment according to FIGS. 5 and 6 differs from the already-described one only by providing a chain drive as the means for converting the tilting movement of the plate 1 into a corresponding tilting movement of the skids 2. The chain drive comprises an endless drive chain 12, which is driven through a driving sprocket 13, which is mounted at the upper portion of the support 5 and rigidly connected to the plate 1, and two driven chain sprockets 14 each of which is rigidly connected to one of the skids 2 and placed in the lower portion of the support 5. The lower run of the endless chain 12 runs about a guide roller 15 which is also mounted in the support 5. It is advantageous, according to the present invention, to use a conventional sprocket chain, which requires only little service and which is largely insensitive to penetration by ice or snow thereinto.

As can be seen in FIG. 1, the plate 1 projects with its leading and trailing portions from the support 5 forwardly and backwardly, respectively. The steering process is substantially facilitated when a user displaces his weight forward or backward relative to the supports 5, and onto the leading or trailing cantilever of plate 1.

Figure 7:
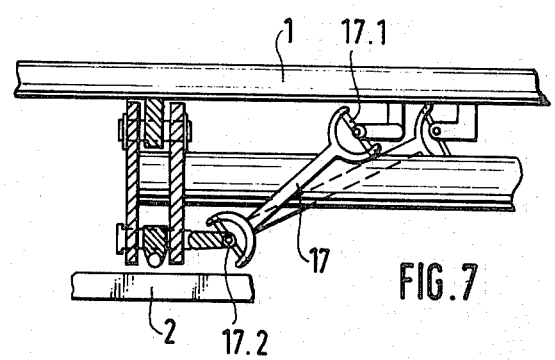
FIG. 7 is a sectional view of an embodiment having a lower drive.
Figure 8:
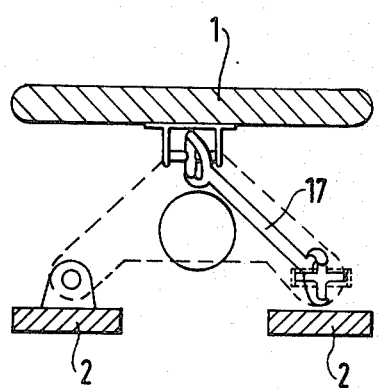
FIG. 8 is a cross-sectional view of the embodiment in FIG. 7.

In the embodiment shown in FIGS. 7 and 8 the means for converting the tilting movement of the plate 1 into a corresponding tilting movement of the skids 2 are formed as lever drives, each comprising a drive shaft 17, which, through a first universal joint 17.1, is rigidly connected with the plate 1, and through a second universal joint 17.2 is rigidly connected with a respective one of the skids 2. The universal joints may, for example, be formed as Cardan joints, as shown in FIGS. 7 and 8.

Figure 9:
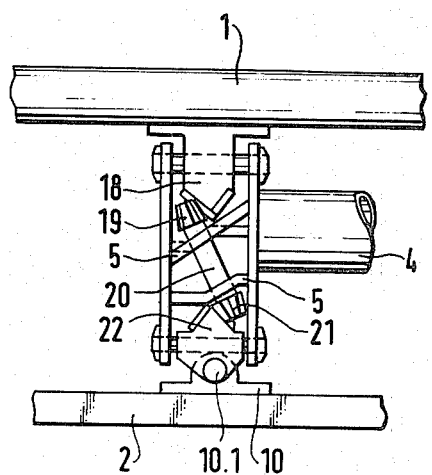
FIG. 9 is a sectional side view of an embodiment having a conical gear drive.

In the embodiment shown in FIG. 9 the plate 1 is provided with a conical driving gear 18 meshing with a conical wheel 19 mounted in an intermediate shaft 20 having at the other end a conical wheel 21 which meshes with a driven conical gear 22 that directly transmits the tilting movement from the plate 1 to each of the skids 2. The intermediate shaft 20 is inclinedly mounted in the support 5, so that each zone of contact of the conical wheels 19 and 21 with the corresponding gears lie on opposite sides of the wheels.

The embodiments shown herein accomplish the transmitting of the tilting movement of the plate 1 to the skids 2 in such a manner that the undersides of skids 2 and plate 1 are always parallel to each other during their tilting movements as shown in FIGS. 3 and 5. It is to be understood that it is also possible to provide the means for transmitting the tilting movement with different transformation ratios, so that the tilting movement of the skids 2 is greater or lesser in comparison with the tilting movement of the plate 1. In order to obtain this, the gears 6, 8 and 9 or the chain wheels 13, 14 can be provided with respectively different diameters.

As shown in FIG. 1, the means for converting the tilting movement of the plate 1 into a corresponding tilting movement of the skids 2 can be provided at both ends of the plate 1. It is to be understood that it may be sufficient to provide only one such means, either at the front or at the rear end portion of the plate, while in this case the other end portion is formed with a conventional bearing for supporting the plate 1 on the skids 2.

It will be understood that each of the elements described above, or two or more together, may also find a useful application in other types of winter sport devices differing from the types described above.

While the invention has been illustrated and described as embodied in a winter sport device, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A winter sport device, comprising a pair of elongated parallel skids; a user support above said skids; and means mounting said support on said skids for converting a tilting movement of said support about a first axis parallel to the elongation of said skids into a corresponding tilting movement of said skids about respective second axes paralleling said first axis, said means including two bridge-shaped supports longitudinally spaced from each other, each end of each of said bridge-shaped supports being fixed on one of said skids, two carriers each fixedly connected to said user support and each mounted on one of said two bridge-shaped supports, a member mounted on said bridge-shaped support for tilting said skids, said member being rigidly connected at one side to said carriers and at the other side to each of said skids so as to keep said skids parallel to said user support during their corresponding tilting movement, and a chain drive including an endless chain operatively connected with a driving chain wheel rigidly connected to said carriers, and two driven chain wheels each of which is rigidly connected to one of said skids.

2. A winter sport device, comprizing a pair of elongated parallel skids, a user support above said skids; and means mounting said support on said skids for converting a tilting movement of said support about a first axis parallel to the elongation of said skids into a corresponding tilting movement of said skids about respective second axes paralleling said first axis, said means including two bridge-shaped supports longitudinally spaced from each other, each end of each of said bridge-shaped supports being fixed on one of said skids, two carriers each fixedly connected to said user support and each mounted on one of said two bridge-shaped supports, a member mounted on said bridge-shaped support for tilting said skids, said member being rigidly connected at one side to said carriers and at the other side to each of said skids so as to keep said skids parallel to said user support during their corresponding tilting movement, said bridge-shaped support being formed as a three-cornered housing, and a gear train installed in said housing, and comprising a driving gear rigidly connected to said carriers and two driven gears each of which is rigidly connected to one of said skids and operatively connected with said driving gear through an intermediate gear mounted on said housing and rotatable about a third axis paralleling said first axis.

3. The device as defined in claim 2, wherein said skids are formed as skies.

4. The device as defined in claim 2, wherein said means comprises at least one bridge-shaped support, each end of said bridge-shaped support being fixed on one of said skids, and a carrier fixedly connected to said user support and mounted tiltably on said at least one bridge-shaped support.

5. The device as defined in claim 2, wherein said two bridge-shaped supports are connected to each other by a connecting member extending parallel to said axes, said connecting member having resilient means mounted thereon and supporting a portion of said user support between said two bridge-shaped supports.

6. The device as defined in claim 5, wherein said resilient means are leg springs, each having one leg fixed to said connecting member and another leg abutting said plate and urging the latter upwardly to a normally horizontal position.

7. The device as defined in claim 5, wherein said connecting member is a tube.

8. The device as defined in claim 2, wherein said driving and driven gears are provided with radial serrations and said intermediate gear includes two intermediate gear elements provided with radial serrations meshing with the radial serrations of said driving and driven gears, respectively.

9. The device as defined in claim 2, wherein said driving gear and said intermediate gars are respective conical gears, and said intermediate gear comprises two intermediate shafts, said shafts being formed at both ends with conical gears meshing with said driving and said driven gears, respectively.

* * * * *